(12) United States Patent
Zhang et al.

(10) Patent No.: US 10,133,553 B2
(45) Date of Patent: Nov. 20, 2018

(54) RECIPROCAL UNIT

(71) Applicant: The Regents of the University of Michigan, Ann Arbor, MI (US)

(72) Inventors: Zhengya Zhang, Ann Arbor, MI (US); Chia-Hsiang Chen, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 227 days.

(21) Appl. No.: 15/049,030

(22) Filed: Feb. 20, 2016

(65) Prior Publication Data

US 2016/0246572 A1    Aug. 25, 2016

Related U.S. Application Data

(60) Provisional application No. 62/119,231, filed on Feb. 22, 2015.

(51) Int. Cl.
*G06F 7/52* (2006.01)
*G06F 5/01* (2006.01)
*G06F 7/535* (2006.01)

(52) U.S. Cl.
CPC .......... *G06F 7/52* (2013.01); *G06F 5/01* (2013.01); *G06F 7/535* (2013.01); *G06F 2205/00* (2013.01); *G06F 2207/5356* (2013.01)

(58) Field of Classification Search
CPC ....................................................... G06F 7/52
See application file for complete search history.

(56) References Cited

U.S. PATENT DOCUMENTS

| | | | | | |
|---|---|---|---|---|---|
| 4,823,301 | A | * | 4/1989 | Knierim | G06F 7/535 708/502 |
| 5,157,624 | A | * | 10/1992 | Hesson | G06F 7/483 708/500 |
| 6,240,338 | B1 | * | 5/2001 | Peterson | G06F 7/535 708/620 |
| 7,346,642 | B1 | * | 3/2008 | Briggs | G06F 1/02 708/497 |
| 2002/0116431 | A1 | * | 8/2002 | Ho | G06F 7/4876 708/502 |
| 2012/0166509 | A1 | * | 6/2012 | Sperber | G06F 7/535 708/502 |

* cited by examiner

*Primary Examiner* — Michael D. Yaary
(74) *Attorney, Agent, or Firm* — Reising Ethington P.C.

(57) ABSTRACT

A reciprocal unit for computing an estimated reciprocal of a number represented by a bit string. The unit comprises a first lookup table configured to receive one or more of the bits in the bit string and to output an initial estimate of the reciprocal of the number. The unit further comprises a second lookup table configured to receive one or more of the bits in the bit string and to output the square of the initial estimate of the reciprocal of the number. The unit still further comprises a multiplier circuit configured to multiply the square of the initial estimate by the number, and an adder-subtractor circuit for subtracting the product of the multiplication from a scaled value of the initial estimate to determine a final estimate of the reciprocal of the number.

20 Claims, 5 Drawing Sheets

RECIPROCAL UNIT

CROSS-REFERENCE TO RELATED APPLICATION

This application claims the benefit of U.S. Provisional Application No. 62/119,231 filed Feb. 22, 2015, the entire contents of which are hereby incorporated by reference.

TECHNICAL FIELD

The present disclosure relates generally to reciprocal units for computing the reciprocal of a number, and more particularly, to reciprocal units for computing an estimated reciprocal of a number represented by a binary bit string used in applications requiring one or more of a high level of precision, a low computation latency, and/or a low implementation cost.

BACKGROUND

Reciprocal computation is an important aspect of inversion and division operations performed by, for example, computers and other hardware devices. Specifically, many scientific and practical applications require the computation of reciprocals with a high level or degree of precision and a low latency. One such application is communication signal processing. For example, multiple-input multiple-output (MIMO) wireless receivers used in wireless communication systems may require a precision on the order of 12 or more bits, and a low latency to support real-time operation. The implementation cost also must be minimized to make viable commercial products. Other applications requiring high precision and low latency reciprocal computation include, for example and without limitation, scientific computing, graphics processing, and matrix inversion, to cite a few possibilities.

While techniques exist for carrying out reciprocal computations with the necessary level of precision, such techniques are not without their disadvantages or drawbacks. Specifically, existing techniques entail using large hardware units having an undesirable amount of latency, complexity and power consumption, less than desirable processing speed, and other disadvantages. For example, FIG. 1 illustrates an example of a known reciprocal unit that utilizes a pair of large lookup tables—a 2048×13 bit lookup table and a 256×6 bit lookup table—requiring the use of a relatively large amount of memory (i.e., 28160 bits). FIG. 2 illustrates an example of a known reciprocal unit that employs an iterative technique utilizing the well known Newton-Raphson algorithm embodied in the following equation: $\tilde{x}_{k+1} = 2\tilde{x}_k - x\tilde{x}_k^2$ wherein: x is a number for which a reciprocal is being computed; $\tilde{x}$ is an estimate of the reciprocal of x; and k is the iteration being performed. As shown, the illustrated unit comprises a lookup table, a multiplexer, a pair of multiplier circuits, and an adder circuit, and requires at least two iterations to compute the reciprocal with the necessary amount of precision. As such, the unit has a relatively high amount of complexity and latency due to the number and type of required components and the delay associated therewith, as well as the need for multiple iterations to achieve the necessary/desired precision. FIG. 3 illustrates yet another example of a known reciprocal unit, a feed-forward reciprocal unit that also utilizes the Newton-Raphson algorithm described above. As shown, the unit comprises a lookup table, a pair of multiplier circuits, and an adder circuit. As with the unit illustrated in FIG. 2, the unit illustrated in FIG. 3 is relatively complex and has a relatively large amount of latency due to the number and type of required components and the delay associated therewith.

Accordingly, there is a need for reciprocal units that compute reciprocals (or estimates thereof) with a high degree of precision and that also minimize and/or eliminate one or more of the above-identified deficiencies.

SUMMARY

According to one embodiment, there is provided a reciprocal unit for computing an estimated reciprocal of a number represented by a bit string. The reciprocal unit comprises a register configured to store the bit string representative of the number, and a first lookup table for providing an initial estimate of the reciprocal of the number. The first lookup table is configured to receive as an input one or more of the bits in the bit string and to output an initial estimate of the reciprocal of the number. The reciprocal unit still further comprises a second lookup table for providing the square of the initial estimate of the reciprocal of the number. The second lookup table is configured to receive as an input one or more of the bits in the bit string and to output the square of the initial estimate of the reciprocal of the number. The reciprocal unit yet still further comprises a multiplier circuit configured to receive as inputs the square of the initial estimate of the reciprocal provided by the second lookup table and one or more of the bits of the bit string representative of the number, to multiply the square of the initial estimate by the number, and to provide as an output the product of the multiplication. The reciprocal unit further comprises an adder-subtractor circuit for subtracting the output of the multiplier circuit from a scaled value of the initial estimate of the reciprocal provided by the first lookup table to determine a final estimate of the reciprocal of the number.

According to another embodiment, there is provided a reciprocal unit for computing an estimated reciprocal of a number represented by a bit string. The reciprocal unit comprises a register configured to store the bit string representative of the number. The reciprocal unit further comprises a first lookup table for providing an initial estimate of the reciprocal of the number. The first lookup table is configured to receive as an input a subset of the bits in the bit string and to output an initial estimate of the reciprocal of the number. The reciprocal unit still further comprises a second lookup table for providing the square of the initial estimate of the reciprocal of the number. The second lookup table is configured to receive as an input the subset of bits in the bit string and to output the square of the initial estimate of the reciprocal of the number. The reciprocal unit yet still further comprises a multiplier circuit configured to receive as inputs the square of the initial estimate of the reciprocal provided by the second lookup table and one or more of the bits of the bit string representative of the number, to multiply the square of the initial estimate by the number, and to provide as an output the product of the multiplication. The reciprocal unit further comprises an adder-subtractor circuit for subtracting the output of the multiplier circuit from a scaled value of the initial estimate of the reciprocal provided by the first lookup table to determine a final estimate of the reciprocal of the number.

According to yet another embodiment, there is provided a method of operating a reciprocal unit to compute an estimated reciprocal of a number represented by a bit string. The method comprises storing the bit string representative of the number in a register. The method further comprises feeding one or more bits of the bit string into a first lookup table to provide an initial estimate of the reciprocal of the number, and feeding one or more bits of the bit string into a second lookup table to provide the square of the initial estimate of the reciprocal. The method still further comprises multiplying the square of the initial estimate of the reciprocal provided by the second lookup table by the number represented by the bit string, and subtracting the product of the multiplication from a scaled value of the initial estimate of the reciprocal to determine a final estimate of the reciprocal of the number.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE ILLUSTRATED EMBODIMENTS

Figure 2:
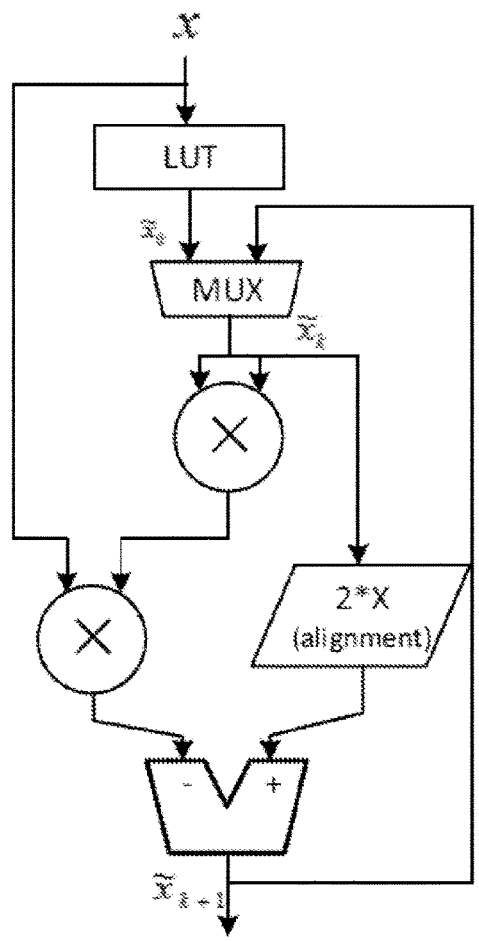
Figure 3:
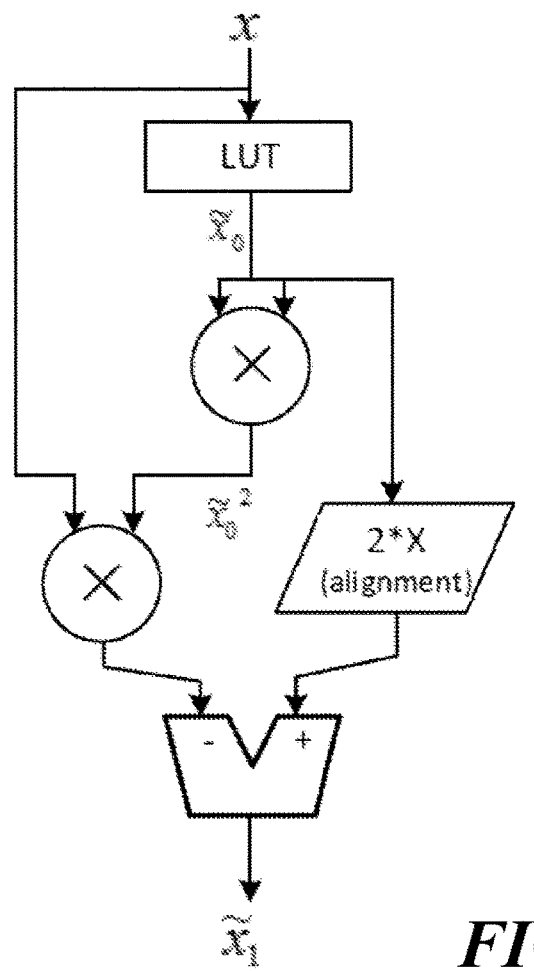

In accordance with one aspect of the present disclosure, a reciprocal unit for computing an estimated reciprocal of a number represented by a bit string is provided. Among potentially other benefits/advantages, the unit computes the estimated reciprocal with a high level or degree of precision (e.g., in an embodiment, 12 or more bits of precision), minimizes hardware overhead, reduces energy and memory usage, and shortens the delay path between the input and the ultimate computation of an estimated reciprocal as compared to extant designs (e.g., those illustrated in FIGS. 1-3), thereby providing better performance than those known designs.

Figure 4:
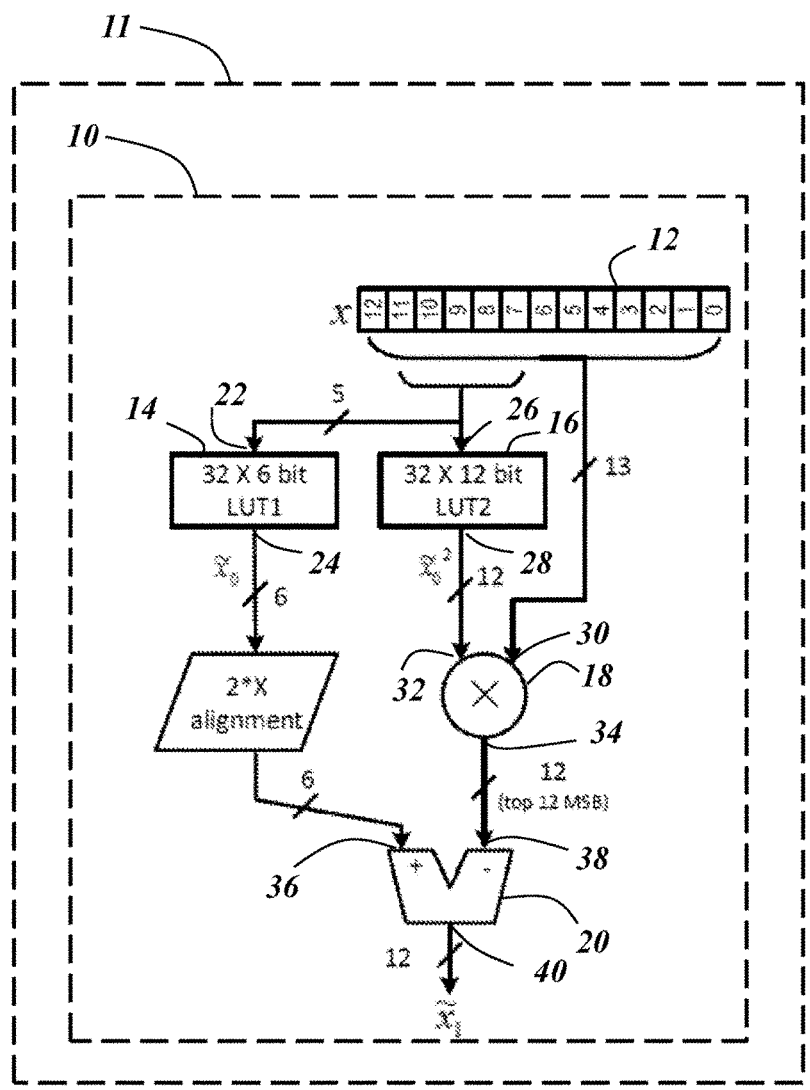
FIG. 4 is a schematic and block diagram of an illustrative embodiment of a reciprocal unit.

FIG. 4 depicts an illustrative embodiment of a reciprocal unit 10. As will be appreciated and as is shown in FIG. 4, the reciprocal unit 10 may be configured to be used in conjunction with one or more other components/devices of a larger system or assembly 11 of which the reciprocal unit 10 is a part, such as, for example, MIMO wireless receivers, scientific computing device/systems, graphics processing systems and matrix inversion systems, to cite a few possibilities. The reciprocal unit 10 is an implementation of the Newton-Raphson algorithm, which, as described above, is embodied in the equation: $\tilde{x}_{k+1}=2\tilde{x}_k-x\tilde{x}_k^2$ (wherein x is a number for which a reciprocal is being computed, $\tilde{x}$ is an estimate of the reciprocal of x, and k is the iteration being performed), and, in at least some instances, is operable to compute the estimated reciprocal in a single iteration using only a subset of the bits in the bit string representing the number x. In the embodiment illustrated in FIG. 4, the reciprocal unit 10 comprises a register 12, a pair of lookup tables 14, 16, a multiplier circuit (or multiplier) 18, and an adder-subtractor circuit (or adder-subtractor) 20. The reciprocal unit 10 may be implemented or embodied on a single chip (e.g., integrated circuit) alone or with other components or devices so as to form a "system-on-a-chip;" while in other embodiments, multiple chips (e.g., integrated circuits) may be utilized (e.g., one or more of the components of the reciprocal unit 10 may be disposed or located on a different chip than one or more other components of the reciprocal unit 10).

The register 12 is configured to store a bit string that is representative of a particular number "x". In an embodiment, the register 12 is a shift register that may be used to shift the bits in the bit string in a particular manner. For example, in an embodiment, and if necessary, the bit string may be shifted to shift the leading "1" of the bit string to a position that is more significant than its current position, for example, the most significant bit (MSB) position (e.g., the left-most position in the bit string). In such an embodiment, and using well-known techniques, the leading "1" in the bit string is detected and a determination is made as to how many bits to shift that bit. In other embodiments, the register 12 is not a shift register, and thus, the bit string as received by the reciprocal unit is not shifted or modified by the register 12, but rather is simply stored in the register 12 in the form in which it was received. The register 12 may be selected to accommodate either a fixed width of the bit strings that are received by the reciprocal unit, or bit strings having a width within a given predetermined range. The present disclosure is not intended to be limited to any particular register; rather any suitable register may be used.

The lookup table 14 is configured to provide an initial estimate of the reciprocal ($\tilde{x}_0$) of the number (x) represented by the bit string stored in the register 12. The lookup table 14 comprises a pre-populated table containing a plurality of empirically-derived estimated reciprocals for a corresponding number of number values. In an embodiment, the lookup table 14 has an input 22 at which an address input comprised of one or more bits of the bit string stored in the register 12 may be received; and an output 24 at which a predetermined estimated reciprocal stored in the lookup table 14 that corresponds to or is correlated with the received bits (i.e., address) may be output. In an embodiment, the address is comprised of a subset of bits of the bit string stored in the register. For purposes of this disclosure, a subset is intended to connote a set of one or more but less than all of the bits of the bit string stored in the register 12. For example, in the embodiment illustrated in FIG. 4, the bit string includes 13 bits, but only a subset of bits of the bit string comprised of the five (5) bits from the second most significant bit down to the sixth most significant bit are fed into the lookup table 14. In this embodiment, the most significant bit is not fed into the lookup table 14 as it is assumed to be a "1." In any event, in other embodiments or implementations, the subset of bits may comprise more or less than five (5) bits, and may comprise bits that include the most significant bits or that include bits other than the most significant bits in the bit string. Accordingly, the present disclosure is not intended to be limited to the use of any particular subset of a given bit string. In an embodiment, the subset of bits may be fixed in the sense that the same bit positions are always used (e.g., the subset may always comprise the bits in the five (5) bit positions as shown in FIG. 4); while in other embodiments, different bit positions may be used depending, for example, on the application. In any event, the subset of bits are fed into the lookup table 14 as an address input, and the lookup table 14 is configured to output the estimated reciprocal ($\tilde{x}_0$) stored at the given address, the output comprising an initial estimated reciprocal of the number (x) represented by the bit string stored in the register 12.

It will be appreciated that the lookup table 14 will have a particular size or Dimensions—A×B bits—that may be dependent upon a number of factors. In an embodiment, the value of the dimension A represents the number of entries in the lookup table 14 for which there is a corresponding estimated reciprocal stored in the lookup table. The number of entries may be dictated by or dependent upon the size of the input the lookup table 14 is configured to receive, in other words, the number of bits in the subset that is fed into the lookup table 14. More particularly, in an embodiment, the number of entries A is equal to $2^n$, where n is the number of bits in the subset of bits being fed into the lookup table 14. Accordingly, in the example provided above wherein five (5) bits are fed into the lookup table 14, $A=2^5$ or 32. The value of the dimension B represents the size or width of the estimated reciprocal for a given entry, in other words, the width of the output of the lookup table 14. The value of B is dictated by, for example, the desired precision of the initial estimated reciprocal, the ultimate final estimated reciprocal described below, or both. For instance, in the example provided above, the output of the lookup table 14 is 6 bits, and so B=6. Thus, in the example above, the lookup table 14 comprises 32×6 bit lookup table. It will be appreciated that the size of the lookup table 14 is considerably less than that of lookup tables used in other known reciprocal units. For example, in the reciprocal unit illustrated in FIG. 1 having a bit string of 12 bits, the lookup tables are 2048×13 and 256×6 bit lookup tables, respectively, which are considerably larger than the 32×6 bit size of the lookup table 14. As a result, the lookup table 14 uses less memory than lookup tables of at least some known reciprocal units (e.g., 192 bits (32×6) vs. 1536 bits (256×6) or 26624 bits (2048×13)).

The lookup table 16 is configured to provide the square of an initial estimate of the reciprocal ($\tilde{x}_0^2$) (the same initial estimate determined by the lookup table 14) of the number (x) represented by the bit string stored in the register 12. The lookup table 16 comprises a pre-populated table containing a plurality of squares of estimated reciprocals for a corresponding plurality of number values. In an embodiment, the lookup table 16 has an input 26 at which an address input comprised of one or more bits of the bit string stored in the register 12 may be received; and an output 28 at which the square of an estimated reciprocal stored in the lookup table 16 at the given address may be output. As with lookup table 14, in an embodiment, the address is comprised of a subset of bits of the bit string stored in the register. In such an embodiment, the subset of bits may be the same subset of bits fed into the lookup table 14, or alternatively, may comprise a different subset of bits. In at least some implementations, the bits fed into the two lookup tables 14, 16 are fed into the lookup tables substantially simultaneously; while in other embodiments the bits may be fed sequentially.

Figure 1:
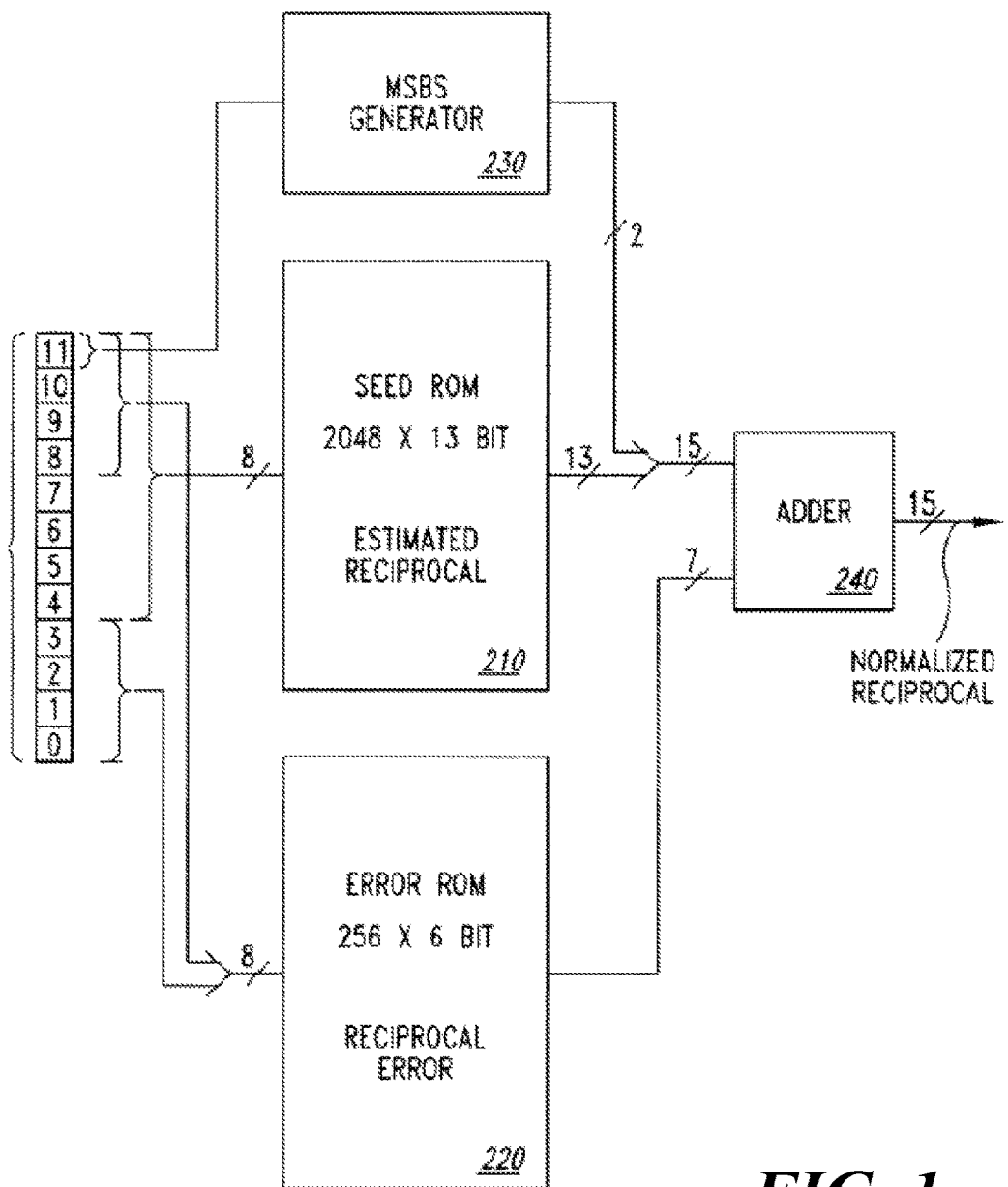
FIGS. 1-3 are illustrate examples of prior art reciprocal units known in the art.

Similar to the lookup table 14, the lookup table 16 will have a particular size or Dimensions—C×D bits—that may be dependent upon a number of factors. In an embodiment, the value of the dimension C represents the number of entries in the lookup table 16 for which there is a corresponding square of an estimated reciprocal stored in the lookup table 16. The number of entries may be dictated by or dependent upon the size of the input the lookup table 16 is configured to receive, in other words, the number of bits in the subset that is fed into the lookup table 16. More particularly, in an embodiment, the number of entries C is equal to $2^n$, where n is the number of bits in the subset of bits being fed into the lookup table 16. Accordingly, in the example provided above wherein five (5) bits are fed into the lookup table 16, $C=2^n$ or 32. The value of the dimension D represents the size or width of the square of an estimated reciprocal for a given entry, in other words, the width of the output of the lookup table 16. The value of D is dictated by, for example, the desired precision of the square of an initial estimated reciprocal, the ultimate final estimated reciprocal described below, or both. For instance, in the example provided above, the output of the lookup table 16 is 12 bits, and so D=12. Thus, in the example above, the lookup table 16 comprises 32×12 bit lookup table. It will be appreciated that the size of the lookup table 16 is considerably less than that of lookup tables used in other known reciprocal units. For example, the lookup tables in the reciprocal unit illustrated in FIG. 1 are 2048×13 and 256×6 bit lookup tables, respectively, which are considerably larger than the 32×12 bit size of the lookup table 16. As a result, the lookup table 16 uses less memory than lookup tables of at least some known reciprocal units (e.g., 384 bits (32×12) vs. 1536 bits (256×6) or 26624 bits (2048×13)).

The lookup tables 14, 16 may be implemented using any number of known electronic memory devices. In one example, one or both of the lookup tables 14, 16 may be stored in or on a read only memory (ROM). In such an embodiment the content of that or those lookup tables 14, 16 is preprogrammed into the lookup table and cannot be modified. In another embodiment, one or both of the lookup tables 14, 16 may be stored in or on a random access memory (RAM). In such an embodiment, it may be possible to modify the content of that or those lookup tables 14, 16. Additionally, the lookup tables 14, 16 may be stored in or on the same memory device or may alternatively be stored on different memory devices. Accordingly, it will be appreciated that the lookup tables 14, 16 may be implemented in a number of ways, and as such, the present disclosure is not intended to be limited to any particular way(s).

As illustrated in FIG. 4, the multiplier circuit 18 has a pair of inputs 30, 32 and an output 34. At the input 30, the multiplier is configured to receive one or more bits in the bit string representative of the number x and stored in the register 12. In at least some embodiments, the entirety of the bit string is received at input 30. At the input 32, the multiplier is configured to receive the output of the lookup table 16, and thus, the square of the initial estimate of the reciprocal of the number x. Accordingly, in the example described above, a 13-bit input representative of the number for which a reciprocal is being computed (x) is received at the input 30, and a 12-bit input representative of the square of the initial estimate of the reciprocal ($\tilde{x}_4^2$) is received at the input 32. The multiplier 18 is configured to multiply the received inputs together, and the product of that multiplication ($x\tilde{x}_0^2$) is output at the multiplier output 34. The multiplier 18 may be comprised of a combination of logic gates that together perform the multiplication operation, and may comprise any suitable multiplier known in the art.

In the embodiment illustrated in FIG. 4, the adder-subtractor circuit 20 includes a pair of inputs 36, 38 and an output 40. The adder-subtractor 20 is configured to receive at the input 36, a scaled value of the initial reciprocal estimate ($\tilde{x}_0$) determined or provided by the lookup table 14. The initial estimate $\tilde{x}_0$ is scaled for purposes of bit alignment and, in an embodiment, effectively comprises multiplying the initial estimate by a factor of two (2) such that the input receives a bit string representative of $2\tilde{x}_0$. This scaling function does not require any additional circuitry other than what is described herein, and basically comprises a bit shift to the left (e.g., a shift to the left by two (2)). In an embodiment, the bit shift may be accomplished through the hardwiring of the bits of the output of the lookup table 14 to the next stage, adder-subtractor 20. The adder-subtractor 20 is configured to receive at the input 38, a bit string representative of the product determined at the multiplier 18; in other words, the output of the multiplier 18 (i.e., $x\tilde{x}_0^2$).

Accordingly, in the example described above and depicted in FIG. 4, a 6-bit input representative the scaled initial estimate of the reciprocal ($2\tilde{x}_0^2$) is received at the input 36, and a 12-bit input representative of the output of the multiplier 18 ($x\tilde{x}_0^2$) is received at the input 38, which may comprise the most significant bits of the product determined by multiplier 18, for example, 12 most significant bits as shown in FIG. 4. The adder-subtractor 20 is configured to subtract the product determined by the multiplier 18 from the scaled initial estimate of the reciprocal ($2\tilde{x}_0 - x\tilde{x}_0^2$), and the difference comprises a final estimate of the reciprocal ($\tilde{x}_1$) of the number x represented by the bit string in the register 12. The final estimate is then output at the output 40 of the adder-subtractor 20 as a bit string. In the embodiment depicted in FIG. 4, the output comprises a 12-bit bit string, though bit strings having other widths may also be used. As with the multiplier 18, the adder-subtractor 20 may be comprised of a combination of logic gates that together perform the subtraction operation, and may comprise any suitable adder-subtractor known in the art.

In an instance wherein the bit string in register 12 was shifted as described above, the final estimated reciprocal ($\tilde{x}_1$) may need to be normalized to account for that initial bit shift. In such an embodiment, and as is well known in the art, the amount by which the bit string was shifted may be used by the reciprocal unit 10 to perform this normalization on the bit string representing the final estimated reciprocal.

Through empirical testing/simulations using a chip-equivalent model of the reciprocal unit 10 illustrated in FIG. 4 and described above, it was found that estimated reciprocals can be computed with a high level of precision using only a few—albeit the most significant—bits of an input bit string. For instance, in the example described above wherein the input to the lookup tables 14, 16 comprised a five (5) bit input and the outputs of the various blocks/stages were as shown in FIG. 4, an average precision of $2^n$ can be achieved with a maximum error of $2^{-9.2}$, which is sufficient for an application such as, for example, a MIMO wireless receiver. The reciprocal unit 10 described above has a number of advantages over at least some of the reciprocal units known in the art. One such advantage is that the reciprocal unit 10 has a shorter path from the input at the lookup tables 14, 16 to the output of the adder-subtractor 20, and therefore, a lesser amount of delay in the computation of an estimated reciprocal, thereby resulting in faster operation of the unit. The unit 10 is less complex than those known in the art (e.g., those illustrated in FIGS. 1-3), and the components used are such that the cost is minimized (e.g., a single multiplier rather than multiple multipliers are used). Additionally, the lookup tables 14, 16 are comparably smaller than those used in other units known in the art, and therefore, less memory is required/used (e.g., 28160 bits, in the case of the unit illustrated in FIG. 1 (($2048 \times 13$)+($256 \times 6$)=28160 bits) vs. 576 bits in the illustrative embodiment depicted in FIG. 4 (($32 \times 6$)+($32 \times 12$)=576 bits)).

Figure 5:
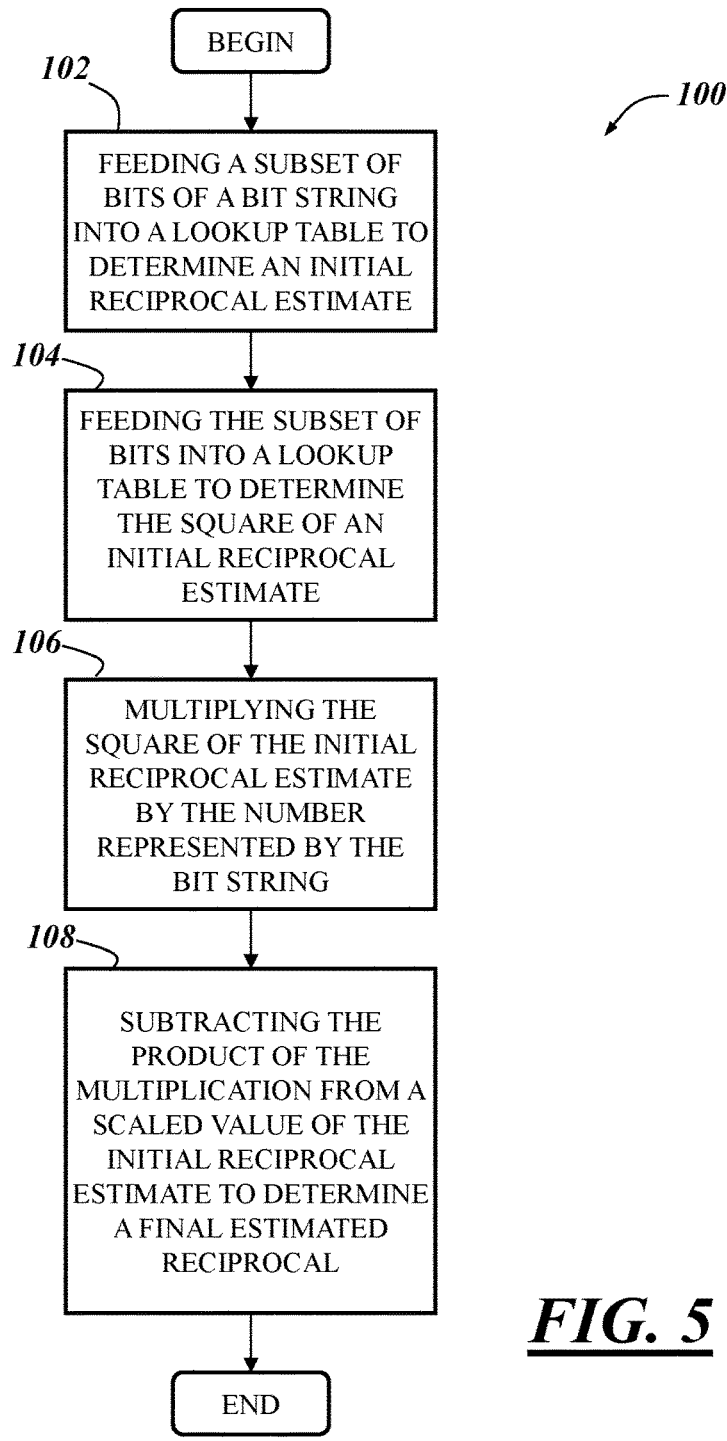
FIG. 5 is a flow diagram depicting various steps of an illustrative embodiment of a method for operating a reciprocal unit, such as, for example, the reciprocal unit illustrated in FIG. 4.

With reference to FIGS. 4 and 5, it will be appreciated that in addition to the structure of the reciprocal unit 10, another aspect of the instant disclosure is a method 100 of operating a reciprocal unit to compute an estimated reciprocal of a number represented by a bit string. It will be further appreciated that the methodology performed and carried out by the reciprocal unit 10 and described in detail above applies to this aspect of the disclosure with equal force, and therefore, it will not be repeated in its entirety, rather a summary of the methodology will be provided. It will be still further appreciated that while method 100 may be described below in the context of reciprocal unit 10, the application of method 100 is not meant to be so limited, but rather method 100 may find application with reciprocal units other than that illustrated in FIG. 4. Additionally, unless otherwise noted, the performance of method 100 is not meant to be limited to any one particular order or sequence of steps or to any particular component(s) for performing the steps.

In an embodiment, method 100 comprises a step 102 of feeding a subset of the bits of a bit string stored in register (register 12) into a lookup table (lookup table 14) to determine an initial estimate of the reciprocal of the number represented by the bit string stored in the register 12. In an embodiment, step 102 may further include scaling the initial estimate of the reciprocal using, for example, the technique described elsewhere above (e.g., shifting the bits in the bit stream output by the lookup table 14). Method 100 further includes a step 104 of feeding that same subset of bits into a lookup table (lookup table 16) to determine the square of the initial reciprocal estimate. In an embodiment, steps 102 and 104 may be performed sequentially, while in other embodiments they may be performed substantially simultaneously.

Method 100 further includes a step 106 of multiplying together, by a multiplier (multiplier 18), the square of the initial reciprocal estimate determined in step 104 and the number represented by the bit string stored in the register 12. In a step 108, the product from step 106 is subtracted from a scaled value of the initial reciprocal estimate determined in step 102 using an adder-subtractor (adder-subtractor 20), and the difference represents a final estimate of the reciprocal of the number. In an embodiment, the final estimated reciprocal may be normalized in a step 108 to account for the scaling of the initial estimate of the reciprocal performed as part of step 102, and this may be done using techniques known in the art.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A reciprocal unit for computing an estimated reciprocal of a number represented by a bit string, comprising:
   a register configured to store the bit string representative of the number;
   a first lookup table for providing an initial estimate of the reciprocal of the number, wherein the first lookup table is configured to receive as an input one or more of the bits in the bit string and to output an initial estimate of the reciprocal of the number;

a second lookup table for providing the square of the initial estimate of the reciprocal of the number, wherein the second lookup table is configured to receive as an input one or more of the bits in the bit string and to output the square of the initial estimate of the reciprocal of the number;

a multiplier circuit configured to receive as inputs the square of the initial estimate of the reciprocal provided by the second lookup table and one or more of the bits of the bit string representative of the number, to multiply the square of the initial estimate by the number, and to provide as an output the product of the multiplication; and an adder-subtractor circuit for subtracting the output of the multiplier circuit from a scaled value of the initial estimate of the reciprocal provided by the first lookup table to determine a final estimate of the reciprocal of the number.

2. The reciprocal unit of claim 1, wherein the register comprises a shift register.

3. The reciprocal unit of claim 1, wherein the one or more bits of the bit string input to the first lookup table comprises a subset of the bits in the bit string.

4. The reciprocal unit of claim 3, wherein the number of entries in the first lookup table is $2^n$, where n is the number of bits in the subset of bits.

5. The reciprocal unit of claim 1, wherein the one or more bits of the bit string input to the second lookup table comprises a subset of the bits in the bit string.

6. The reciprocal unit of claim 5, wherein the number of entries in the first lookup table is $2^n$, where n is the number of bits in the subset of bits.

7. The reciprocal unit of claim 1, wherein the one or more bits input to the first lookup table and the one or more bits input to the second lookup table are the same and comprise a subset of the bits in the bit string.

8. The reciprocal unit of claim 1, wherein the one or more bits of the bit string input to the multiplier circuit comprise a subset or all of the bits of the bit string.

9. A system comprising the reciprocal unit of claim 1.

10. A reciprocal unit for computing an estimated reciprocal of a number represented by a bit string, comprising:

a register configured to store the bit string representative of the number;

a first lookup table for providing an initial estimate of the reciprocal of the number, wherein the first lookup table is configured to receive as an input a subset of the bits in the bit string and to output an initial estimate of the reciprocal of the number;

a second lookup table for providing the square of the initial estimate of the reciprocal of the number, wherein the second lookup table is configured to receive as an input the subset of bits in the bit string and to output the square of the initial estimate of the reciprocal of the number;

a multiplier circuit configured to receive as inputs the square of the initial estimate of the reciprocal provided by the second lookup table and one or more of the bits of the bit string representative of the number, to multiply the square of the initial estimate by the number, and to provide as an output the product of the multiplication; and an adder-subtractor circuit for subtracting the output of the multiplier circuit from a scaled value of the initial estimate of the reciprocal provided by the first lookup table to determine a final estimate of the reciprocal of the number.

11. The reciprocal unit of claim 10, wherein the number of entries in the first and second lookup tables is $2^n$, where n is the number of bits in the subset of bits.

12. The reciprocal unit of claim 10, wherein the one or more bits of the bit string input to the multiplier circuit comprise a subset or all of the bits of the bit string.

13. The reciprocal unit of claim 10, wherein the register comprises a shift register.

14. A system comprising the reciprocal unit of claim 10.

15. A method of operating a reciprocal unit to compute an estimated reciprocal of a number represented by a bit string, comprising:

storing the bit string representative of the number in a register;

feeding one or more bits of the bit string into a first lookup table to provide an initial estimate of the reciprocal of the number;

feeding one or more bits of the bit string into a second lookup table to provide the square of the initial estimate of the reciprocal;

multiplying the square of the initial estimate of the reciprocal provided by the second lookup table by the number represented by the bit string; and subtracting the product of the multiplication from a scaled value of the initial estimate of the reciprocal to determine a final estimate of the reciprocal of the number.

16. The method of claim 15, further comprising scaling the initial estimate of the reciprocal by scaling the initial estimate up by a factor of 2.

17. The method of claim 15, wherein before one or more bits are fed into either the first or second lookup tables, the method further comprises shifting the bits in the register in a manner that shifts the leading "1" in the bit string to a more significant position.

18. The method of claim 15, wherein the one or more bits fed into the first lookup table comprises a subset of the bits in the bit string.

19. The method of claim 15, wherein the one or more bits fed into the second lookup table comprises a subset of the bits in the bit string.

20. The method of claim 15, wherein the one or more bits fed into the first lookup table and the one or more bits fed into the second lookup table are the same and comprise a subset of the bits in the bit string.

* * * * *